Jan. 16, 1945. E. L. HELWIG 2,367,642
METHOD OF PREPARING THERMOPLASTIC DOMES
Filed March 28, 1942
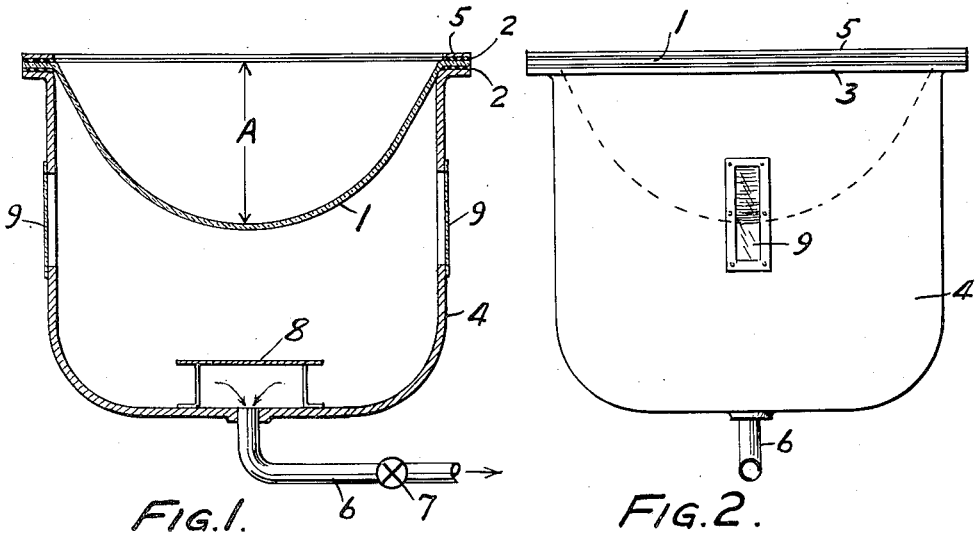
FIG.1. FIG.2.
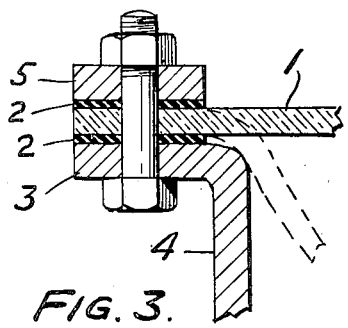 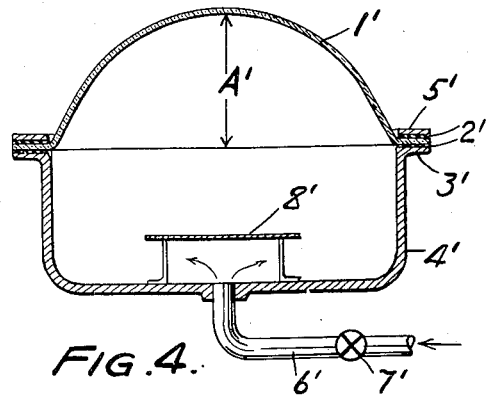
FIG.3. FIG.4.
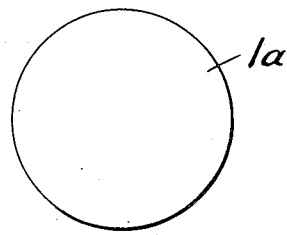 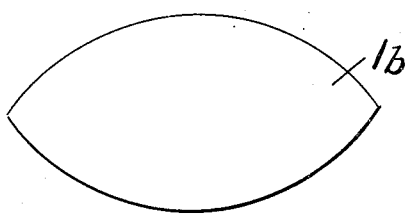
FIG.5. FIG.6.
INVENTOR
WITNESS:
Edward L. Helwig
BY
ATTORNEY.

Patented Jan. 16, 1945

2,367,642

UNITED STATES PATENT OFFICE 2,367,642

METHOD OF PREPARING THERMOPLASTIC DOMES

Edward L. Helwig, Bristol, Pa., assignor to Röhm & Haas Company, Philadelphia, Pa., a corporation of Delaware Application March 28, 1942, Serial No. 436,632

5 Claims. (Cl. 18—56)

This invention relates too a method and apparatus for shaping organic thermoplastic sheet material into objects having three-dimensional curved surfaces and which may be classified as "domes." The words "dome" or "domes" as used herein are understood to include three-dimensional curved objects which are of symmetrical concave or convex shape having the form of a spherical section or polar zone, such as a hemisphere, or other surfaces of revolution. While all three-dimensional curved objects having a symmetrical concave or convex form are included within the scope of the definition, I am particularly concerned with such objects as airplane turrets, cockpit enclosures, bomber-noses, transparent curved windows for bombardiers' stations, safety guards, shockproof helmets, instrument and machine housings and containers.

When thermoplastic materials are used for the manufacture of those objects listed above and for other purposes it is desirable and often necessary that the surface be as highly polished and as smooth as that of plate glass. To produce the necessary high polish on curved sheets of the thermoplastic material after they are shaped is extremely difficult and expensive. For this reason, the common practice has been to produce the surface finish before shaping the sheet material. The difficulty has always been that the shaping operation involves the use of molds which tends to mar the surface and produce irregularities which require subsequent polishing. U. S. Patents Nos. 2,123,552 and 2,142,445, issued July 12, 1938 and January 3, 1939, respectively, cover processes in which pressure is applied by a fluid and, therefore, marring is reduced on the surface on the pressure side of the sheet. While these processes represent an advance in the art, both involve the use of molds which are expensive and which, although they are so arranged as to exert a minimum back-pressure against the sheet, nevertheless still tend to deface or mar the surface of the molded object.

My invention is unique in that it does not require the use of any mold whatever but operates in free space. That is to say that the curved portion of the thermoplastic sheet does not come in contact with any rigid surface and that during the drawing or stretching operation the sheet is surrounded by a gas. Therefore, the thermoplastic sheet does not become defaced during shaping.

The details of the process can best be appreciated from a consideration of the drawing.

Figure 1 is a side elevation in section of an assembly, suitable for forming a thermoplastic dome by reducing the pressure within the assembly. It shows the sheet of thermoplastic material 1 in a hemispherical shape. The details of clamping have been omitted from this figure for the sake of simplicity.

Figure 2 is a front elevation of the same assembly, not in section.

Figure 3 is a detailed drawing of one method of clamping the sheet of thermoplastic material in position prior to the forming operation.

Figure 4 is a sectional view of an assembly, suitable for forming a thermoplastic dome by increasing the pressure within the assembly, showing the sheet of thermoplastic material 1 in a curved shape.

Figure 5 represents a simplified horizontal cross-section of the assembly indicating that the pressure chamber may be circular in cross-section.

Figure 6 represents a simplified horizontal cross-section of an assembly indicating that the pressure chamber may be other than circular in cross-section.

In the operation of the process, a rubber gasket 2 is laid on the rim 3 of the pressure chamber 4 and thereupon is laid a sheet of thermoplastic material 1 which is in the ductile condition. A second gasket 2 is applied and finally a metal ring 5 is applied and the assembly is clamped in suitable manner such as detailed in Figure 3. Alternative clamping devices, such as C-clamps or quick-action clamps, may be employed. The use of clamps instead of bolts obviates the need of pre-drilling the thermoplastic sheet to accommodate the bolts. Even with bolts the sheet need not necessarily be drilled if it is of such diameter as to fit within the line of bolts and can be held securely by the rim of the chamber and ring. There is less tendency for the sheet to slip if the rim has a rolled lip. It is well understood that the ring may alternatively be held in position by a lever device which would eliminate the need of individual clamps or bolts. After the ductile thermoplastic sheet is securely held in position at its rim, the pressure chamber is partially evacuated through pipe 6 and the rate of flow of the gas is regulated by valve 7. In this way a gaseous pressure differential is set up on opposite sides of the sheet. A deflection plate 8 permits smoother operation. As the pressure is reduced in the chamber 4, the thermoplastic sheet is gradually forced, by the external atmospheric pressure, to assume a curved shape. The operation is continued until the sheet is drawn to the desired extent as measured by distance —A— and as determined by observation through the sight-glass 9. When the desired shape has been obtained, the pressure is so balanced as to maintain the shape of the dome until the dome has cooled and hardened, after which the pressure inside the chamber 4 is brought to that of the atmosphere and the dome is removed.

Instead of applying suction as described, the ductile sheet may be formed by applying gaseous pressure to the inside of the chamber as shown in Fig. 4.

A distinct advantage of the process is that the dome is formed in free space, out of contact with rigid surfaces which would tend to deface the surface of the dome. However, it is understood that the apparatus and method may be employed using dies. For example, referring to Fig. 1, a mold or die may be inserted into the chamber above the sheet after the sheet has been sucked down. After the die is in position, the sheet may be allowed to shrink back against the die, in which position it is then allowed to harden. Or, referring to Fig. 4, a mold or die may be placed above the sheet and the sheet may be forced against the form and held in that position until it has cooled and hardened sufficiently to permit handling.

As shown in Figs. 5 and 6, the horizontal cross-section of the pressure chamber may be either circular or other than circular. Domes of greatly varying shapes may be prepared by using pressure chambers of varied cross-section and by drawing the sheet to varying extents, i. e. by varying the distance —A— or —A'— in Figs. 1 and 4, respectively.

Although hemispherical domes may be of particular utility in connection with aircraft, it is apparent that other shapes can be made by this method of operating into free space depending upon the extent to which the sheet is drawn.

In the construction of the pressure chamber, devices may be added so as to make the operation automatic. For example, instead of determining the final endpoint of the drawing operation by visual observation through the sight-glass, this can be determined by the use of an "electric eye" or photo-electric cell so arranged that it can actuate the pressure valves during the drawing operation. Or, other pressure release mechanisms or pneumatic valves may be so employed as to render the operation automatic. These are preferably equipped with full range throttling attachments to insure smooth operation.

Although I prefer to work with the polymeric derivatives of acrylic acid and methacrylic acid, the process is not limited to these materials. Thermoplastic materials in general may be formed by this process into curved objects. A list of such materials includes the following which may be used in various combinations: polymeric derivatives of acrylic acid, methacrylic acid, styrene, acrylamides, chlorinated and otherwise substituted acrylate and methacrylate polymers, plasticized nitrocellulose and combinations involving the esters and ethers of cellulose such as cellulose acetate, cellulose acetobutyrate, ethyl cellulose, benzyl cellulose, methylcellulose, and vinyl chloride and vinyl acetate, including copolymers of two or more polymeric materials.

*Example 1*

A polished sheet of polymethyl methacrylate, one-quarter of an inch in thickness and four feet in diameter, was heated at about 135° C. until it had become soft and ductile. It was then clamped to the rim of pressure chamber 4 with suitable clamping devices, as, for example, shown in Fig. 3. Pressure chamber 4 was then partially evacuated and the sheet was drawn to a curved shape. When the sheet had been drawn to the shape of a hemisphere, the pressure differential was balanced by adjusting valve 7 so as to hold the thermoplastic material in the hemispherical shape for a period of about 10 minutes during which it cooled to a firm, rigid condition. Thereafter, the dome was removed from the pressure chamber. The surface of the dome was in no wise marred or defaced.

*Example 2*

A polished sheet of cellulose acetate, one-eighth of an inch thick and of the same diameter (four feet) as the rim of the pressure chamber 4, was heated until it became ductile. It was than suitably clamped to the rim of the pressure chamber. The internal pressure in chamber 4 was reduced and the ductile sheet was forced, by the differential pressure on its two sides, to assume a curved form. Suction was continued until the distance —A— in Fig. 1 was 12 inches. At this point the shape of the dome was maintained by balancing the pressures until the dome became sufficiently cool, rigid and firm to permit handling. On removal from the chamber the dome was found to have a highly polished and unmarred surface.

*Example 3*

A polished, ductile, pre-heated sheet of polymethyl methacrylate, one-quarter inch thick, was suitably clamped to the rim of a pressure chamber like that shown in Fig. 4. The cross section of the chamber was essentially like that shown in Fig. 6. The internal pressure was increased by admitting compressed air through valve 7'. The sheet was stretched by this gaseous pressure differential until the distance —A'— was one-half of the longest dimension of the original sheet. At this point the shape of the dome was maintained while it cooled to a firm, rigid condition after which it was removed from the pressure chamber and found to be free of surface irregularities. This dome had the shape like that of the surface of a spherical segment.

Various modifications of the procedure set forth above will be apparent to those skilled in the art. Such modifications as come within the scope of the appended claims are likewise within the scope of this invention.

I claim:

1. The process of preparing symmetrical thermoplastic domes, free of surface defects, which comprises heating a sheet of organic, thermoplastic material until it is ductile, clamping the edges of said ductile sheet to the rim of a hollow pressure chamber, reducing the pressure within said pressure chamber, thereby stretching said sheet to the shape of a dome in free space within said pressure chamber, regulating the pressure to maintain said desired domed shape in free space until the thermoplastic material has cooled to a temperature at which it is not readily deformed, and removing the dome from the pressure chamber.

2. The process of preparing symmetrical thermoplastic domes, free of surface defects, which comprises heating a sheet of organic, thermoplastic resin from the group consisting of acrylate and methacrylate polymers until it is ductile, clamping the edges of said ductile sheet to the rim of a hollow pressure chamber, reducing the pressure within said pressure chamber, thereby stretching said sheet to the shape of a dome in free space within said pressure chamber, regulating the pressure to maintain said desired domed shape in free space until the thermoplastic resin has cooled to a temperature at which it is not readily deformed, and removing the dome from the pressure chamber.

3. The process of preparing symmetrical thermoplastic domes, free of surface defects, which comprises heating a sheet of cellulose acetate until it is ductile, clamping the edges of said ductile sheet to the rim of a hollow pressure chamber, reducing the pressure within said pressure chamber, thereby stretching said sheet to the shape of a dome in free space within said pressure chamber, regulating the pressure to maintain said desired domed shape in free space until the cellulose acetate has cooled to a temperature at which it is not readily deformed, and removing the dome from the pressure chamber.

4. The process of preparing symmetrical thermoplastic domes, free of surface defects, which comprises heating a sheet of polymeric styrene until it is ductile, clamping the edges of said ductile sheet to the rim of a hollow pressure chamber, reducing the pressure within said pressure chamber, thereby stretching said sheet to the shape of a dome in free space within said pressure chamber, regulating the pressure to maintain said desired domed shape in free space until the polymeric styrene has cooled to a temperature at which it is not readily deformed, and removing the dome from the pressure chamber.

5. The process of preparing symmetrical thermoplastic domes, free of surface defects, which comprises heating a sheet of polymethyl methacrylate until it is ductile, clamping the edges of said ductile sheet to the rim of a hollow pressure chamber, reducing the pressure within said pressure chamber, thereby stretching said sheet to the shape of a dome in free space within said pressure chamber, regulating the pressure to maintain said desired dome shape in free space until the polymethyl methacrylate has cooled to a temperature at which it is not readily deformed, and removing the dome from the pressure chamber.

EDWARD L. HELWIG.